United States Patent [19]
Rao et al.

[11] Patent Number: 5,650,242
[45] Date of Patent: Jul. 22, 1997

[54] ANTIMONY-ARSENIC-TIN-SELENIUM LEAD-BASED STRAP ALLOYS FOR LEAD-ACID BATTERIES

[75] Inventors: Purushothama Rao, Eagan; Steven R. Larsen, Oakdale, both of Minn.

[73] Assignee: GNB Technologies, Inc., Mendota Heights, Minn.

[21] Appl. No.: 583,902

[22] Filed: Jan. 11, 1996

[51] Int. Cl.$^6$ .................................................. H01M 2/28
[52] U.S. Cl. .................................. 429/161; 429/158
[58] Field of Search .................................. 429/158, 160, 429/161; 420/569

[56] References Cited

U.S. PATENT DOCUMENTS

| | | | |
|---|---|---|---|
| 5,298,350 | 3/1994 | Rao | 429/245 |
| 5,434,025 | 7/1995 | Rao et al. | 429/245 |
| 5,508,125 | 4/1996 | Bantz et al. | 429/160 |

Primary Examiner—M. Nuzzolillo
Attorney, Agent, or Firm—Leydig, Voit & Mayer, Ltd.

[57] ABSTRACT

Automotive SLI lead-acid batteries are disclosed which are characterized by enhanced resistance to intercell connection corrosion, even when exposed to the relatively high under-the-hood service temperatures in use with recent model automobiles. The straps are formed from a lead-based alloy including from about 2.0 to 2.6% or so antimony, from about 0.04 to 0.07% tin, from about 0.04 to about 0.07% arsenic, and from about 0.012 to about 0.030% selenium, the percentages being based upon the weight of the alloy.

6 Claims, 3 Drawing Sheets

ANTIMONY-ARSENIC-TIN-SELENIUM LEAD-BASED STRAP ALLOYS FOR LEAD-ACID BATTERIES

This invention relates to lead-acid batteries, and, more particularly, to alloys for use in making the plate straps and intercell connections in such batteries.

BACKGROUND OF THE INVENTION

Over the last fifteen to twenty years or so, there has been substantial interest in automotive-type, lead-acid batteries which require, once in service, little or no further maintenance throughout the expected life of the battery. This type of battery, often termed a "maintenance free battery", was first commercially introduced in 1972 and is currently in widespread use.

There has been a considerable amount of attention addressed to the type of alloys used in maintenance-free batteries. When the maintenance-free batteries were first commercially introduced, conventional automotive lead-acid batteries commonly used grids formed from antimony-lead alloys in which the antimony content ranged from about 3–4.5% by weight of the alloy composition. Such alloy compositions were capable of being formed into battery grids by gravity casting techniques widely used in the 1970's. Moreover, the batteries made using grids of those alloy compositions had desirable deep discharge cycling characteristics.

Unfortunately, such high antimony content lead alloys could not be used for grids for maintenance-free batteries. The use of such alloys resulted in batteries having undesirable gassing characteristics. In other words, grids made from such alloys accepted an excessive current during constant voltage overcharge so that excessive gas generation occurred. Accompanying this gas generation was the loss of water from the sulfuric acid electrolyte. Much commercial interest for alloys for maintenance-free batteries centered around calcium-tin-lead alloys and "low antimony" lead alloys, i.e., the antimony contents in such alloys being in a range of about 1–2% by weight or so.

In conventional lead-acid battery construction, a strap is cast onto the lugs located on the battery plates to electrically connect the plates of the same polarity together. This cast strap typically includes a portion, often termed a "tombstone" because of its shape, which is positioned adjacent to an aperture in the battery container cell partition. Adjacent tombstones and associated straps which connect plates of opposite polarity are initially assembled on either side of the aperture and are then welded to form an intercell weld in a through-the-cell partition configuration. This intercell weld then serves as the current path from one cell of the battery to the adjacent cell. As used herein, the term "strap" or "battery strap" refers to the strap connecting the lugs of the respective battery plates as well as the portion used to form the intercell connection.

Whether the lead-acid batteries were of a maintenance-free type or not, the intercell connection has been of substantial concern to battery manufacturers. Thus, a considerable amount of technology has developed over the years in an effort to provide a reliable, through-the-partition intercell connection.

One type of technology has been termed an "extrusion-fusion" welding process. In this process, both the adjacent cell tombstones are first extruded under cold metal flow conditions into the aperture in the cell partition. The extruded tombstone portions are then fused using electrical resistance heating to form a weld nugget completely filling the cell partition or aperture. Many other techniques are known for forming the intercell connections, among these being processes in which the intercell weld is created principally or solely by fusion.

Crucial to any of the processes by which the intercell connection is made is the need to have an electrolyte-tight seal between the portion of the strap forming the tombstone weld nugget and the partition wall. Such a tight seal is needed for many reasons. It is thus desired to prevent any path for electrolyte from one cell to another that would create, in effect, a minor short-circuit path. Without cell-to-cell electrolyte isolation which would be compromised by even a minor short circuit path, the desired and correct maintenance of the battery voltage is likewise compromised. Additionally, and importantly, when intercell welds corrode and fail, the potentiality for explosions exists as is well known.

Maintaining the electrolyte-tight seal throughout a satisfactory battery service life is quite difficult. Thus, the intercell weld nugget is typically submerged to some extent in the electrolyte. Accordingly, intercell corrosion problems can become a significant concern.

It is, of course, well recognized that lead-acid batteries are perishable products. Eventually, such batteries will fail; and there are several possible failure modes, e.g., due to positive grid corrosion. The thrust of maintenance-free batteries has been to forestall the failure in performance for a period of time commensurate with the expected life of the battery, e.g., three to five years or so. However, for the reasons evident from the foregoing, it is highly desirable, if not perhaps essential, to have the eventual failure mode to be other than failure due to faulty intercell connections.

In the past several years, there have been several factors which have complicated the situation. One is seemingly ever-increasing power and energy requirements for SLI automotive batteries. Many factors have contributed to the need and/or desire for batteries having more power.

Yet another complicating factor is the "under-the-hood" space requirements. Automobile manufacturers have lessened the space available for the batteries. Typically, it has become necessary to provide lower profile batteries, i.e., batteries having a less overall height than previously used.

These complicating factors of increasing power and less available space have required battery manufacturers to alter the internal configuration and designs to provide the power and energy needed in the desired low profile container. This has typically involved increasing the number of plates per cell and decreasing the thickness of the battery grids. For example, the number of plates in a BCI Group 24 battery over the past several years has increased from about 13 to about 19 or so, while the thickness of the positive grids has decreased from about 70–75 mils down to 55 mils, and even 45 mils or so. This has allowed battery manufacturers to provide batteries having relatively high rated capacities.

What has also occurred in recent years for various reasons is a substantial increase in the vehicle under-the-hood temperature to which an automotive SLI battery is exposed. This increased temperature obviously presents a particularly acute situation in the warmer climates. One battery manufacturer has perceived that, in the recent past, the temperature in such warmer climates to which an SLI battery in service is exposed has risen from about 125° F. to about 185° F. in new automobiles, or even more.

The specific temperature increase to which SLI batteries are now exposed is not per se of particular importance. What is important is that the under-the-hood temperatures have in fact increased. The impact of this rise in vehicle under-the-hood temperatures on the failure modes and the timing of such failures has been substantial. The incidence of premature battery failure due to failure of intercell welds has been significant. The industry has failed to appreciate the impact of all of these complicating factors on current maintenance-free battery designs and their performance and useful service life.

One attempt to deal with the acute problem of the high under-the-hood temperatures has been to retrench. Thus, one automotive battery manufacturer has developed a battery specifically directed for use in high heat environments in which thicker positive grids are used, less plates per cell are used and the head space in each cell is filled with hollow plastic microspheres. The presence of such microspheres may perhaps be perceived to function as a vapor barrier to electrolyte to minimize evaporative loss of water in the electrolyte or for limiting heat transfer or for perhaps some other purpose.

A wide variety of strap alloys have been used over the years in maintenance-free and in other SLI battery applications. More typically, these lead-based alloys include antimony, arsenic and tin in a wide variety of levels together with other alloying ingredients such as copper, sulfur and selenium. Typically, the antimony content has ranged from about 2.7 to about 3.4% by weight of the total alloy. One prior alloy of this general antimony content also included, arsenic in the range of 0.13–0.2%, tin in the range of 0.3–0.4% and selenium in the range of 0.013–0.02%. Another antimony-lead alloy of this type also included arsenic in the range of 0.16– 0.19%, tin in the range of 0.14–0.16% with copper in the range of 0.05–0.06% and sulfur in the range of 0.0007–0.0017%. Still another antimony-lead alloy used in an SLI automotive battery included arsenic at a level of 0.07%, tin at 0.06% and copper at 0.037%. Lastly, still another strap alloy of this type used in an SLI automotive battery included arsenic at a level of 0.005%, tin at a content of 0.005%, selenium at 0.008%, copper at 0.003% and sulfur at 0.0006%.

U.S. Pat. No. 5,169,734 to Rao et al. disclosed a lead-based alloy that imparted to an intercell weld the desired mechanical characteristics that resulted in substantially enhanced corrosion resistance in actual service life. Indeed, batteries made using strap alloys in accordance with the '734 Rao et al. patent provided substantial improvements in service life in comparison to batteries made using prior strap alloys.

The '734 patent is predicated on the discovery that a major failure mode of intercell welds is due to the buildup of a corrosion layer, believed to be at least principally of lead sulfate on the negative tombstone and lead dioxide on the positive tombstone. The corrosion process is a natural occurrence in a lead-acid battery; and the rate of this corrosion is greatly influenced by battery service temperature, grid chemistry and method of strap production, and strap alloy chemistry, among other factors. It is the intent of the battery designer to restrict the corrosion rate to an acceptable, controlled rate so that the intercell connections of the battery do not fail prematurely in service.

In conjunction with the '734 invention, it was discovered that a corrosion layer builds up on the tombstone face between the cell partition wall and the adjacent tombstone face of the intercell weld. This buildup occurs on the tombstone face on both positive and negative polarity tombstones of the adjoining cells. As the buildup occurs, the corrosion layer is believed to function as a wedge, forcing the face of the weld out of electrolyte-tight contact with the cell partition. This wedging action causes stress fractures or cracks and propagates such fractures and cracks through the intercell weld nugget, or around the weld through the tombstone parent metal matrix ultimately leading to failure of the intercell connection.

In view of this wedging action, Rao et al. discovered that the strap alloy employed must impart to the resulting intercell weld a unique set of mechanical properties for the intercell weld to survive the high temperature conditions which are present in current automobiles when operated in the warmer climates. More specifically, it was found that the strap alloy used to make the intercell connection must impart to the resulting intercell weld adequately high toughness or higher total energy required to fracture the material while having satisfactory ductility.

The lead-based alloys in the '734 patent that impart to an intercell weld these desired mechanical characteristics have the following composition, all of the percentages being based upon the total weight of the lead alloy: antimony in the range of from about 3.0–3.3% or so, arsenic in the range of from about 0.04 to 0.07% or so, tin in the range of from about 0.04 to 0.07%, and selenium in the range of from about 0.014 to 0.02%. The changes in the composition of alloys of this type from those previously used, Rao et al. note, may appear superficially to be somewhat subtle, but these changes impart substantially different results in terms of corrosion resistance in actual service life.

Further, Rao et al. determined that the intercell connection failure mode observed in batteries subjected to continuous 155° F. exposure (sometimes termed "hot box" exposure) were found to be very similar to the intercell connection failures observed in batteries removed from vehicle service due to premature failure. Accordingly, such hot box exposure was considered to provide an accelerated and reliable laboratory test to prove the adequacy, and the method for evaluating the integrity of, the intercell connections in lead-acid batteries. According to the Rao et al. '734 patent, satisfactory intercell connections should be capable of reliably withstanding the 155° F. hot box exposure for at least 15 weeks without the appearance of cracks visible in photomicrographs at 10× amplification. More preferably, Rao et al. state that intercell connections should be capable of reliably withstanding at least 20 weeks of hot box exposure at 155° F., viz., essentially all of the intercell connections will not show cracks in essentially all of the batteries tested. In other words, out of 100 batteries tested, Rao et al. indicate that "reliably withstanding" such exposure should result in no more than one battery or so that fails through a faulty intercell weld due to intercell corrosion.

One dramatic breakthrough which has been made is reflected in U.S. Pat. No. 5,298,350 to Rao. The Rao '350 patent thus discloses low calcium-tin-silver lead alloys for forming positive grids which impart to the resulting battery substantially enhanced resistance to positive grid corrosion, particularly when the battery is exposed to the relatively high under-the-hood temperatures of current automobiles in warmer climates. Indeed, the decrease in premature battery failure due to positive grid corrosion achieved when the Rao alloys are utilized to make the positive grids is remarkable.

This breakthrough, in effect, has extended the time window for the service life of automotive batteries, lessening the grid growth that can contribute to weld failure and making the service life achievable from the intercell weld ever so more important. The strap alloys used in forming cast-on straps and the intercell welds in the Rao et al. '734 patent certainly provide desirable weld life; yet, as the service life requirements become ever more demanding, yet still further improvement is needed.

It is accordingly an object of the present invention to provide a maintenance-free, lead-acid battery capable of satisfactory service life even when exposed to the relatively high temperature under-the-hood environment in the automobiles which have been manufactured in the last several years.

Another and more specific object lies in the provision of an alloy composition that may be used for making the straps for such maintenance-free batteries.

A still further object provides a strap alloy for such batteries that imparts to the batteries enhanced resistance to corrosion in comparison to alloys presently being used.

Yet, another object of the present invention is to provide an SLI automotive lead-acid battery in which the eventual principal battery failure mode is a mode other than faulty intercell welds.

Other objects and advantages of the present invention will be apparent as the following description proceeds, taken in conjunction with the accompanying drawings.

SUMMARY OF THE INVENTION

In general, as is discussed in the '734 patent, desirable lead-based strap alloys for lead-acid batteries must possess a unique combination of toughness and ductility and relatively slower corrosion rates that allow intercell connections formed from such alloys to reliably withstand 155° F. hot box exposure and typical vehicle service conditions. Such alloys thus must possess relatively high strength-ultimate tensile strength while exhibiting relatively high ductility (i.e., elongation) toughness and relatively low corrosion rates. Further, overaging and the accompanying loss of ductility following aging of the alloys described in the '734 patent are relatively small in comparison to other alloys of this type.

However, in an effort to provide even further improvements in strap alloys, it has been found that an analysis of the toughness and ductility characteristics are not of substantial significance. More particularly, tensile data indicates a trend of increasing strength with increasing antimony content and toughness and elongation trends which are seemingly of no meaningful difference as the antimony content of antimony-arsenic-selenium-tin lead-based alloys is evaluated.

Even further, it is believed that the corrosion mechanism described in the Rao et al. '734 patent is far more complex than originally understood. Indeed, it is believed that the mechanism involves a complicated time and temperature dependent relationship, as well as an extremely low creep or strain phenomena that has proved difficult to simulate with a mechanical property evaluation so as to effectively predict weld life under actual battery service conditions.

Surprisingly, pursuant to this invention, it has been discovered that lead-based alloys that will impart significantly improved service life and relatively low corrosion rates can be provided simply by subtle adjustment of the antimony content of these antimony-selenium-arsenic-tin alloys. Indeed, the alloys of the present invention can be expected to provide substantial weld life improvement in comparison with the previously used alloys as described herein.

While the invention is susceptible of various modifications and alternative forms, specific embodiments thereof will hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION OF THE PREFERRED EMBODIMENTS

Figure 1:
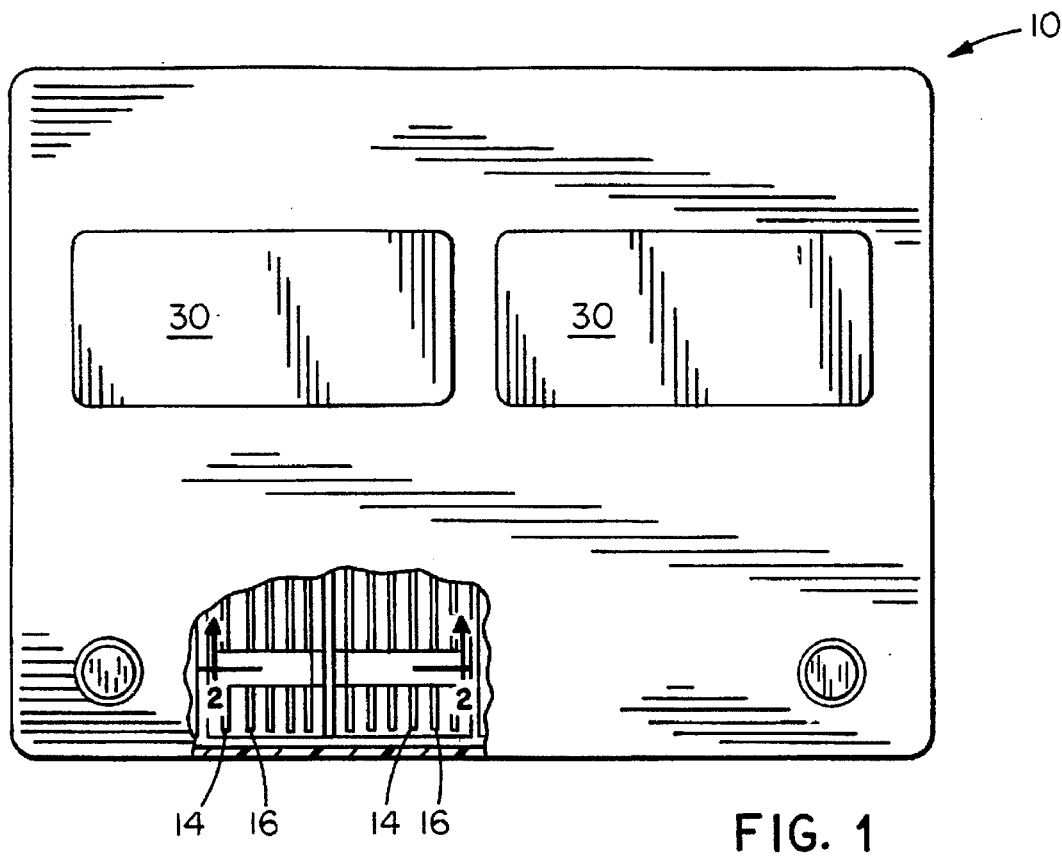
FIG. 1 is a top plan view of a maintenance-free battery in accordance with the present invention and is partly cut-away to show the interior.

Turning now to FIG. 1, there is shown a maintenance-free battery utilizing the unique strap alloy composition of this invention. Thus, a maintenance-free battery 10 is shown which includes a container, a pair of terminal posts, and a cover sealed to the container by any conventional means. The container is divided into a plurality of cells and a battery element is disposed in each of the cells. This element includes positive grids 14 and negative grids 16. The electrodes, as is conventional, include a supporting grid structure having an integral lug 17, a layer of active material attached thereto and a strap joining the lugs 17 of the respective positive and negative grid structures together.

The intercell connection is shown generally at 20 and includes opposing tombstones 22 in electrolyte-tight contact with the cell partition 24. The aperture 26 in the cell partition 24 has fused portion 28 that forms the cell-to-cell connection through aperture 26. The terminal posts are similarly electrically connected through strap 18 to the battery plates. Suitable venting means for allowing evolved gases to escape are shown at 30.

While any alloys may be used to form the positive grids, it is preferred to utilize the low calcium-tin-silver lead alloys disclosed in the Rao '350 patent. The use of such alloys imparts to the resulting battery remarkably enhanced resistance to positive grid corrosion, particularly when the battery is exposed to the relatively high under-the-hood temperatures of current automobiles in warmer climates. More particularly, the alloys disclosed possess both reduced high temperature positive grid corrosion rates and extremely low creep rates. The latter characteristic is important since, prior to such alloys, an additional force component contributing to the fracture of intercell welds has been grid growth. Further, as is disclosed in the Rao '350 patent, suitable lead-based alloys for positive grids, based upon the total weight of the alloy comprise as an-added composition having calcium in an amount of about 0.025–0.06%, tin in an amount of about 0.3–0.7%, and silver in the range of about 0.015–0.045%. As to the calcium content, due to losses during strip casting, the actual calcium content in the resulting strip will be somewhat less than the as-added composition previously noted.

When positive grids are manufactured using an expanded grid mesh made from a directly cast strip as is disclosed in U.S. Pat. No. 5,434,025 to Rao et al., the composition of the alloy is adjusted somewhat. The grid alloy thus comprises a lead-based alloy having from about 0.02 to 0.05% calcium, from about 0.3 to 0.5% tin, and 0.02 to 0.045% silver, the percentages being based upon the weight of the grid. The use of such directly cast positive grids in the present invention is particularly preferred. The '025 patent describes how such grids can be made, and the disclosure is herein incorporated by reference.

The negative grids may be formed from any alloy composition desired, and there are a wide variety of such alloy compositions which have been used in maintenance-free applications. Typically, it will be more preferred to utilize antimony-free, lead-based alloys. Particularly suitable are the calcium-tin-lead alloys in widespread use.

Figure 2:
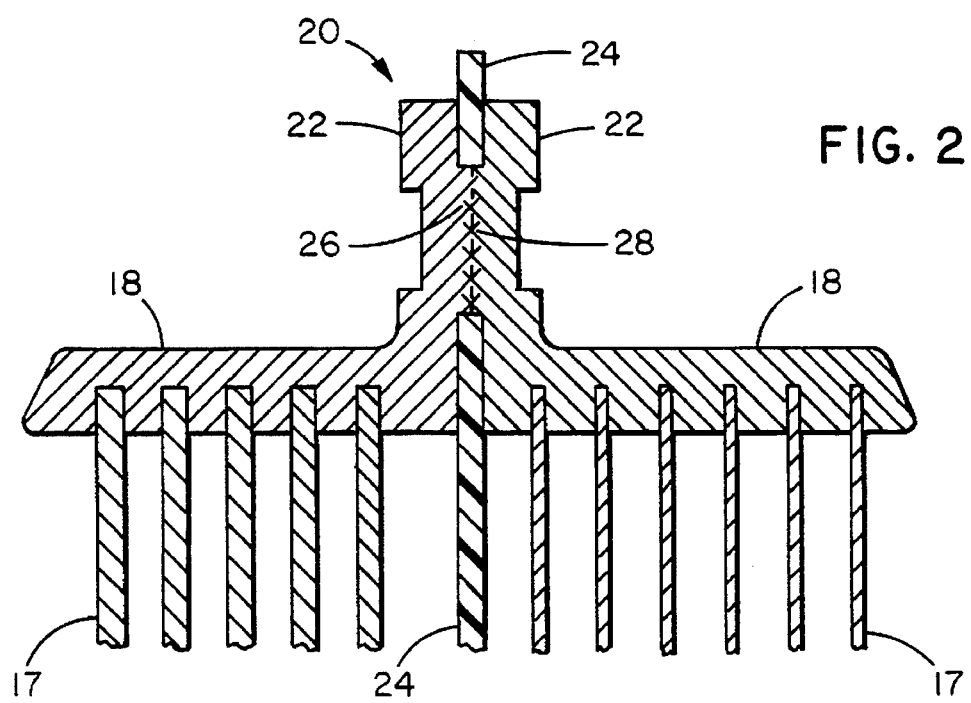
FIG. 2 is a cross-sectional view taken generally along the line 2—2 of FIG. 1 and illustrating the strap and intercell connection utilized.

The particular construction of the battery generally shown in FIGS. 1 and 2 may be varied as desired for the intended application. The strap alloys used in the present invention thus may be advantageously employed in any type of lead-acid batteries. For example, in addition to the top terminal battery illustrated herein, the strap alloys of this invention may be desirably used in dual terminal batteries, such as, for example, are shown and described in U.S. Pat. No. 4,645,725. Similarly, these strap alloys may be used in side terminal lead-acid batteries.

As to the intercell connection shown in FIG. 2, this connection can be formed by any of the several intercell welding or forming techniques that are well known in this field. These known processes include both fusion and extrusion-fusion processes. When an extrusion-fusion process is used, it will be more desirable to allow for uniform cooling so as to provide a uniform microstructure throughout the weld, with the lack of any solidification defects, such as hot cracks or hot tears. The ability to provide such welds is well-known in the art.

The substantial improvement in service life which can be achieved in accordance with the present invention is particularly evident when the intercell connections are made using extrusion-fusion processing. In this regard, as has been alluded to herein, it is preferred to utilize more uniform cooling during the cast-on-strap operation and to ensure that the tougher parts of the weld that are more susceptible to corrosion problems, cracking and the like, are cooled more quickly, such as may be accomplished by providing an air jacket or the like about the cast part as it is cooled. Likewise, by ensuring that the overall mass of the weld is as small as possible consistent with the structural objectives, as by thinning the tombstone, quicker cooling can be achieved and this is also thus desirable.

In accordance with the present invention, it has been found that, in contrast to the alloy composition disclosed in the '734 Rao et al. patent, a slight reduction in the antimony content of a lead-based alloy consisting essentially of lead, antimony, tin, arsenic, and selenium will provide strap alloys which, in service, will yield substantially improved service life in comparison to such alloys having a somewhat higher antimony content. What is particularly surprising is that the reliable 155° F. hot box tests exhibit such improved high temperature corrosion resistance of the resulting intercell welds made using the strap alloys of this invention, even though no such predictability exists based upon mechanical property observations. Thus, the strap alloys of the present invention are capable of reliably withstanding continuous exposure to 155° F. for at least 50 weeks. Indeed, the present invention can achieve such performance for even more than 50 weeks.

While many theoretical explanations can be offered, no single explanation is considered to adequately explain the profound effects on the high temperature corrosion resistance characteristics obtained merely through a subtle change in the antimony content. Nevertheless, the results are real, having been consistently obtained in separate hot box tests, and such tests have been established to be strongly indicative of performance in actual service.

More particularly, in such lead-based strap alloys, it has been found that antimony levels in the range of from about 2.3 to about 2.6 or so, based upon the total weight of the alloy composition, will achieve superior high temperature corrosion resistance in service. An antimony content of about 2.4 to 2.5 percent by weight is particularly preferred. Suitable high temperature corrosion resistance may also be provided with somewhat lower antimony content, perhaps down to about 2.0 percent by weight. However, the antimony content should not be decreased so far that the lug bonding attributes are compromised due to reduced solidification range and decrease in overall strength and toughness of the resulting strap. On the other hand, somewhat higher levels of antimony than about 2.6% may be utilized, but it should be appreciated that increasing antimony contents approaching the 3.0 percent level disclosed in the Rao et al. '734 patent will begin to provide alloys which become indistinguishable in performance and will not enjoy the profound improvements capable of being achieved with the present invention.

As regards the arsenic content, the arsenic should be present in an amount to provide the requisite age hardening effect for the overall alloy. However, undue levels of arsenic tend to make the resulting alloys very brittle at the low stress levels as are present in automotive SLI batteries. Accordingly, it would be generally preferred to utilize arsenic in the range of from about 0.04 to about 0.07 percent by weight; but the amounts may vary somewhat based upon the functional objectives required for this alloying constituent.

With respect to the tin content, the inclusion of appropriate levels of tin contributes to the desirable mechanical properties and improves the corrosion characteristics of the alloy as well as providing low electrical resistance and enhancing lug bonding attributes. However, too high levels may be counterproductive to providing the desired high temperature corrosion resistance characteristics for intercell weld formed from the strap alloys of this invention. Accordingly, with these objectives in mind, it will generally be preferred to maintain the tin content in the range of from about 0.04 to about 0.07 percent by weight; however, as was the case with the arsenic content, the tin content may vary somewhat from this preferred range consistent with the functional objectives required. Higher toughness, good ductility and stability in mechanical properties and the desired corrosion resistance are achieved only when the tin and arsenic contents are closely controlled in the ranges specified.

As regards the selenium level, the selenium should be present in an amount to impart satisfactory grain refinement to the resulting alloy, avoiding problems in the intercell weld such as splitting the weld nugget that would otherwise occur. A selenium level of from about 0.012 to about 0.030 may be used consistent with the objectives herein. More preferably, the selenium level is from about 0.02 to 0.03%.

Figure 3:
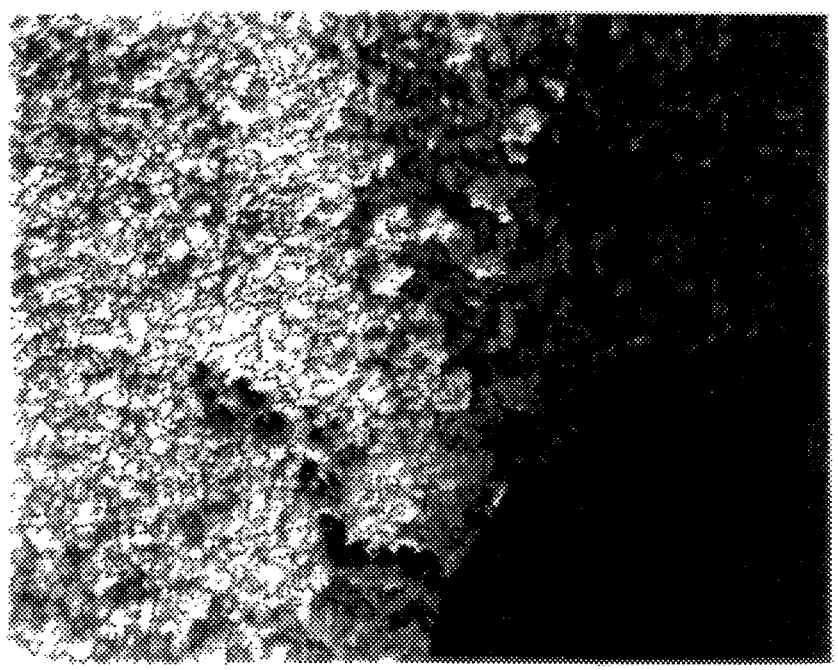
FIGS. 3 and 4 are photomicrographs, at 50× amplification showing the microstructures of battery intercell connections sectioned vertically and longitudinally with respect to the battery, these microstructures being only of the 6 o'clock or lower area, the dark area of the bottom of the photomicrograph showing the plastic partition (i.e., the cell wall), these photomicrographs showing the welds after an exposure of 45 weeks at 155° F. environment for an alloy having the composition described in the '734 patent (FIG. 3) and an alloy in accordance with the present invention (FIG. 4)
Figure 4:
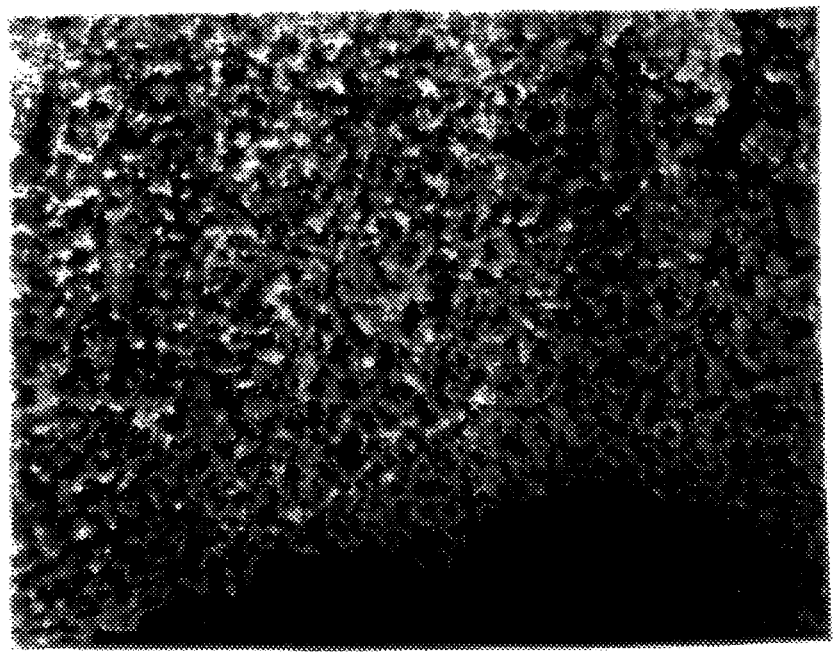

Two separate tests of batteries were made with strap alloys, differing in their antimony content. In each of these tests, the composition according to the '734 Rao et al. patent comprised a nominal composition, based upon the total weight of the alloy, of 3.1% antimony, 0.05% arsenic, 0.05% tin, 0.018% selenium, and the remainder lead. This was in contrast to the strap alloy used in the other batteries tested, which included the use of strap alloys in accordance with the present invention. In these tests, the nominal composition of the arsenic, tin, and selenium alloying constituents in the lead-based alloy were identical to the nominal composition of the '734 Rao et al. strap alloy, while the antimony content was 2.4% by weight. In the first test, Group 58G automotive lead-acid batteries were prepared using the strap alloys of both alloy compositions. The batteries were placed in an environmental chamber at 155° F. (the hot box test) and were charged periodically when the State of Charge reached a point where the specific gravity of the electrolyte fell to 1.120. The electrolyte specific gravity of the fully charged battery was 1.285. The intercell connectors were extracted in intervals of 5 weeks through an exposure of 45 weeks. Metallography was performed by cross-sectioning the intercell weld vertically as such welds were oriented in the battery. High magnification observation of the weld nugget at the cell partition was done to inspect for crack initiation. In the batteries using the strap alloys of the present invention, no fracture initiation sites were observed at either the upper (12 o'clock) or lower (6 o'clock) positions until after 20 weeks, whereas the batteries using the Rao et al. '734 strap alloy composition showed one crack in a weld after 20 weeks of hot box exposure. This test showed that the batteries using the strap alloys of the present invention retained excellent weld integrity over the 45 week test with only 9% of the total welds observed showing any fracture initiation in the welds, and these were only at the 6 o'clock position and very small in length. On the other hand, the batteries using the prior alloy composition showed fracture initiation in about 30% of the total welds, one of the fracture initiation sites being at the 12 o'clock position. Yet, the residual shear strengths of the two strap alloys were considered similar. FIGS. 3 and 4 show, respectively, at a magnification of 50×, the microstructure of a battery intercell connection section vertically and longitudinally with respect to the battery, the microstructures being only of the 6 o'clock or lower area and the darker area of the bottom of the photomicrograph being the plastic partition, FIG. 3 showing the section weld made using the prior strap alloy and FIG. 4 showing the same section of an intercell weld using the alloy of the present invention, both being after 45 weeks of exposure in the hot box.

Figure 5:
FIGS. 5 and 6 are photomicrographs similar to those in FIGS. 3 and 4 except showing similar intercell connections after an exposure of 55 weeks at 155° F. environment for an alloy having a composition as described in the '734 patent (FIG. 5) and in accordance with the present invention (FIG. 6).
Figure 6:
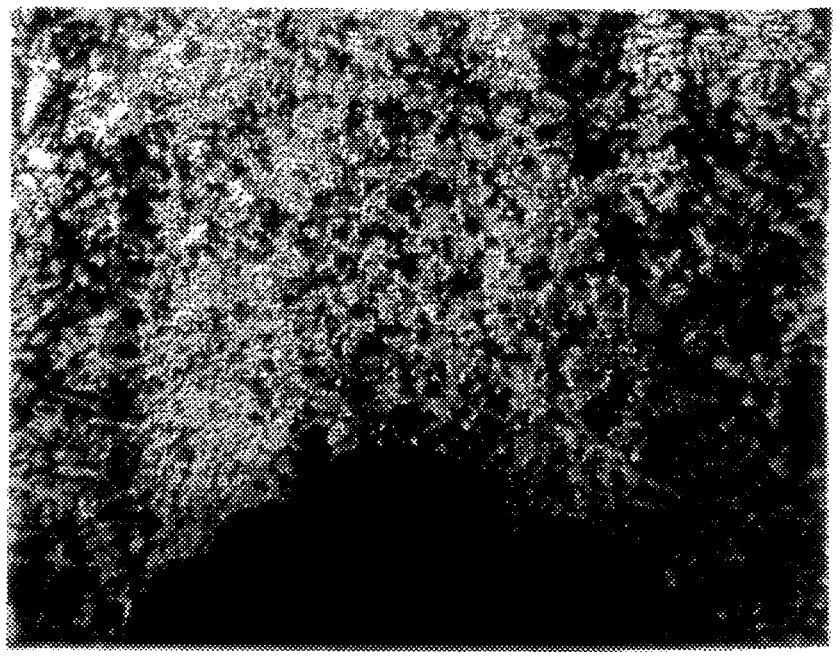

A second series of tests, using these same two strap alloys were similarly conducted, and these tests were carried out for a period of 55 weeks. The prior strap alloys showed fractures occurring in 22% of the 64 welds observed (a total of 64 welds being observed). In contrast, the intercell welds using the strap alloy of this invention indicated no observed fractures present in the 64 welds analyzed. FIGS. 5 and 6 show the sections similar to FIGS. 3 and 4, showing the condition after 55 weeks of exposure in the hot box test.

The data from both of these tests clearly show the uniqueness of the alloys of the present invention in the ability to resist brittle fracture in the intercell welds at the conditions extant in the reliable hot box test. Thus, as has been seen, the present invention provides strap alloys that allow batteries to successfully withstand the relatively high under-the-hood temperature conditions without enduring failure due to corroded intercell connections.

We claim:

1. An automotive SLI battery comprising a battery container having a plurality of cells and an electrolyte contained in the cells, each cell having a plurality of positive and negative electrodes disposed therein comprising a grid supporting structure having a layer of active material attached thereto, and a strap connecting the appropriate electrodes together, said strap including an intercell connection, said strap being formed of a lead-based alloy consisting essentially of lead, from about 2.0 to 2.6 percent antimony, from about 0.04 to 0.07 percent tin, from about 0.04 to 0.07 percent arsenic, and from about 0.012 to 0.030 percent selenium, the percentages being based upon the weight of the alloy.

2. The battery of claim 1, wherein the antimony content is from about 2.3 to 2.6%.

3. The battery of claim 1, wherein said strap is made by extrusion-fusion.

4. The battery of claim 1, wherein at least some of the positive grids are made from a lead-based alloy consisting essentially of calcium in an amount of from about 0.025 to 0.06%, tin in an amount of from about 0.3 to 0.7%, and silver in the range of from about 0.015 to 0.045%, based upon the weight of the alloy, as added.

5. The battery of claim 1, wherein the positive grids are made from an expanded metal mesh of a directly cast strip and from a lead-based alloy having a composition of from about 0.02 to 0.05% calcium, from about 0.3 to 0.5% tin, and 0.02 to 0.045% silver, the percentages being based upon the weight of the grid.

6. An automotive SLI lead-acid battery comprising a battery container having a plurality of cells and electrolyte contained in the cell, each cell having a plurality of positive and negative electrodes disposed therein comprising a grid supporting structure and a lead-based alloy strap containing the appropriate electrodes together, said strap including an intercell connection, said strap being capable of reliably withstanding continuous exposure to 155° F. for at least 50 weeks.

* * * * *